US009620008B2

(12) United States Patent
Schmüdderich et al.

(10) Patent No.: US 9,620,008 B2
(45) Date of Patent: Apr. 11, 2017

(54) METHOD AND SYSTEM FOR USING GLOBAL SCENE CONTEXT FOR ADAPTIVE PREDICTION AND CORRESPONDING PROGRAM, AND VEHICLE EQUIPPED WITH SUCH SYSTEM

(71) Applicant: HONDA RESEARCH INSTITUTE EUROPE GMBH, Offenbach/Main (DE)

(72) Inventors: Jens Schmüdderich, Offenbach/Main (DE); Andreas Richter, Offenbach/Main (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 14/812,357

(22) Filed: Jul. 29, 2015

(65) Prior Publication Data
US 2016/0063858 A1 Mar. 3, 2016

(30) Foreign Application Priority Data

Aug. 29, 2014 (EP) .................................... 14182749

(51) Int. Cl.
*B60W 40/04* (2006.01)
*G08G 1/01* (2006.01)
(Continued)

(52) U.S. Cl.
CPC ....... *G08G 1/0125* (2013.01); *B60W 30/0956* (2013.01); *B60W 40/04* (2013.01);
(Continued)

(58) Field of Classification Search
CPC G08G 1/0125; B60W 30/0956; B60W 40/04; G06K 9/00805
(Continued)

(56) References Cited

U.S. PATENT DOCUMENTS 6,429,789 B1* 8/2002 Kiridena ................... B60R 1/00
340/905
8,885,039 B2* 11/2014 Jang ....................... G01C 21/36
340/436
(Continued)

FOREIGN PATENT DOCUMENTS

DE     103 49 881 A1    5/2005
DE  10 2005 005 140 A1  8/2006
(Continued)

OTHER PUBLICATIONS

European Search Report dated Feb. 12, 2015, issued in corresponding EP Patent Application No. 14182749.03-1901.
(Continued)

*Primary Examiner* — Yazan Soofi
(74) *Attorney, Agent, or Firm* — Squire Patton Boggs (US) LLP

(57) ABSTRACT

The invention regards a method for assisting a driver of a vehicle by computationally predicting a future movement behavior of a target vehicle. The method comprises steps of acquiring data describing a traffic environment of a host vehicle, computing a plurality of future movement behavior alternatives for a target vehicle, by predicting movement behavior of the target vehicle based on the data describing the traffic environment. The prediction step calculates a probability that the target object will execute a movement behavior and information relating to future behavior of the target vehicle is output. The method estimates a global scene context and adapts the predicted behavior based on the estimated global scene context. The adaptation of the behavior prediction is performed by at least one of adapting indicator values in situation models employed by a context-based prediction, by adapting a result of the context-based prediction and adapting the overall prediction result.

12 Claims, 16 Drawing Sheets

(51) Int. Cl.
*B60W 30/095* (2012.01)
*G06K 9/00* (2006.01)

(52) U.S. Cl.
CPC ..... *G06K 9/00805* (2013.01); *B60W 2550/20* (2013.01); *B60W 2710/18* (2013.01); *B60W 2720/10* (2013.01)

(58) Field of Classification Search
USPC .......................................................... 701/117
See application file for complete search history.

(56) References Cited

U.S. PATENT DOCUMENTS

| | | | |
|---|---|---|---|
| 9,381,916 B1* | 7/2016 | Zhu | B60W 30/0956 |
| 2013/0116859 A1 | 5/2013 | Ihlenburg et al. | |
| 2015/0073662 A1* | 3/2015 | Schmudderich | B62D 6/00 |
| | | | 701/41 |
| 2015/0158469 A1* | 6/2015 | Cheatham, III | B60T 7/12 |
| | | | 701/96 |
| 2015/0266477 A1* | 9/2015 | Schmudderich | B60W 30/09 |
| | | | 701/98 |

FOREIGN PATENT DOCUMENTS

| | | |
|---|---|---|
| EP | 2 562 060 A1 | 2/2013 |
| WO | 2005/102765 A1 | 11/2005 |

OTHER PUBLICATIONS

"Transport information and control systems—Adaptive Cruise Control systems—Performance requirements and test procedures" International Standard ISO 15622, Oct. 15, 2002 (32 pages).

Sarah Bonnin et al., "General Behavior Prediction by a Combination of Scenario Specific Models" IEEE Transactions on Intelligent Transportation Systems, vol. PP, Issue 99, 2014 (11 pages).

* cited by examiner

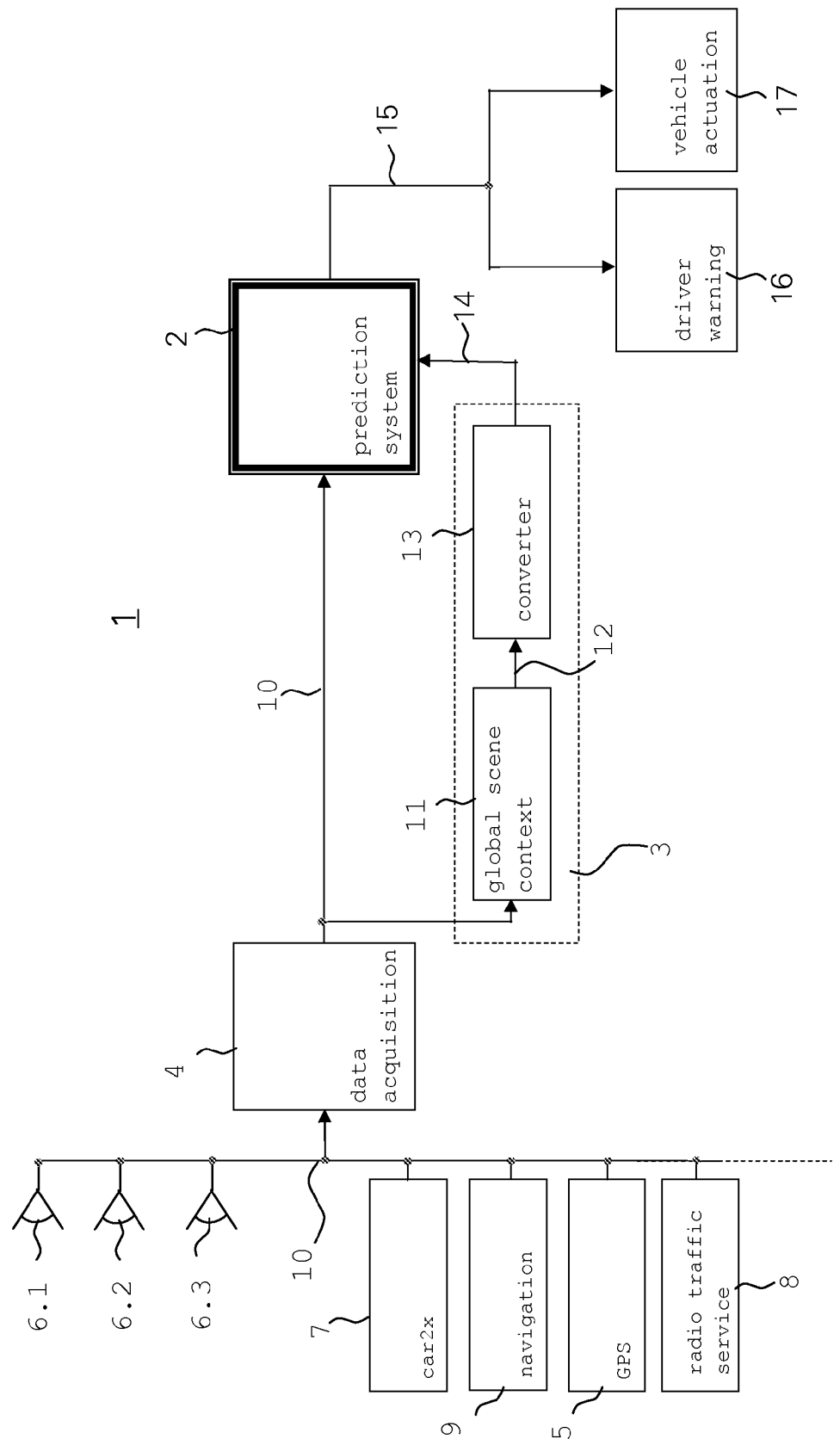

Fig.7A
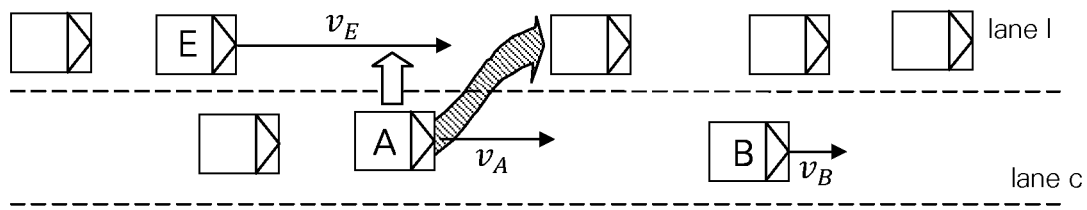
Fig.7B
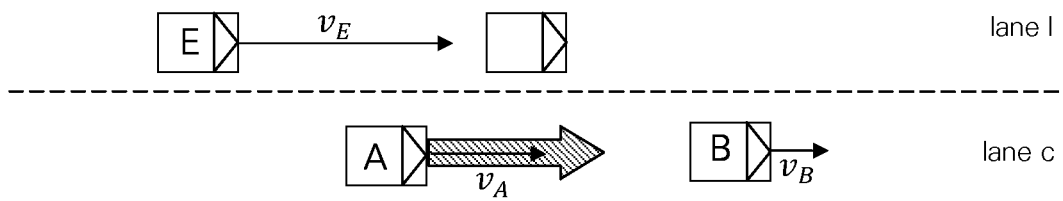

METHOD AND SYSTEM FOR USING GLOBAL SCENE CONTEXT FOR ADAPTIVE PREDICTION AND CORRESPONDING PROGRAM, AND VEHICLE EQUIPPED WITH SUCH SYSTEM

BACKGROUND

Field

The present invention relates to the field of automated, computerized driver assistance for vehicles. The invention regards in particular a method and corresponding program for computationally predicting a future movement behaviour of a target vehicle taking into account a global scene context, the vehicle equipped with such system and the system itself.

Description of the Related Art

An automated driver assistance system in a vehicle in most cases includes a sensor physically sensing the environment of the vehicle, and a computing unit, supplied with a sensor output signal, and computing an output signal which assists the driver in the guidance of the vehicle. The output signal may be supplied to optical or acoustical indication means and/or to a controller unit for controlling an actuator of the vehicle. An actuator of the vehicle might be a part of safety device, for example an inflator for an airbag system, or an actuator influencing the movement of the vehicle, for example brakes, accelerator, steering.

Driver assistance systems such as an "Adaptive Cruise Control" (ACC) system (for example described in ISO-Norm 15622:2010) increase driver comfort and safety. ACC systems are especially used for carrying out longitudinal control of a host vehicle, for example with respect to a target speed specified by the driver and ranging to other traffic objects such as other vehicles, for example cars, motorbikes, bikes, trucks or pedestrians. Driver assistance systems, for example lane change assistants, base on predicting a future behaviour of other participants in a traffic environment of a vehicle with aid of a prediction system.

The term "host vehicle" will be used in the following elaboration for a vehicle in a traffic situation which has a prediction system according to the invention mounted thereon and which is equipped with the sensors and/or further means for acquiring traffic related data and a computing system that allows the computation of a possible or likely future behaviour of at least one other traffic vehicle. The host vehicle is sometimes also referenced as ego-vehicle.

A sensor may be any means that can deliver information suitable for describing a traffic scene at a point of time by physically sensing an environment of the host vehicle. Such sensors may be cameras, radar, lidar or the like. A data acquisition means forms part of the driver assistance system for acquiring any kind of information describing the traffic scene provided by one or more sensors our other data sources.

A target object or target vehicle is an object or a vehicle for which a future behaviour shall be estimated. The target object may be observed by the sensor(s) or information regarding the target object/vehicle may be obtained by the data acquisition means from other data sources.

One problem of commonly known driver assistance systems is that usually the system only takes into consideration behaviour of other traffic vehicles which is recognized by physical prediction. If for example one of the target objects (a vehicle in the environment of the host vehicle and physically sensed by one or more sensors of the host vehicle) changes the lane thereby cutting the lane of the host vehicle or cutting out to another lane, the host vehicle observing the other traffic objects only reacts after such lane change is certain. In consequence the reaction of the host vehicle is delayed which has a negative influence on the traffic flow and in particular on the comfort of the driver of the host vehicle.

Physical prediction relies on direct indicators which provide variables, which are observable if and only if the behaviour to be detected has already started. For example for predicting a lane-change, direct indicators are lateral velocity, lateral position relative to the lane, changing orientation relative to the lane, or changing orientation relative to other traffic participants.

EP 2 562 060 A1 proposes to use in addition to such physical prediction process a so-called context-based prediction. In such context-based prediction a probability of the future movement behaviour of a target object is calculated. This future behaviour is then either confirmed or dismissed by the result of the physical prediction. For calculating the probability of a possible future movement behaviour of the target objects, indirect indicators are used which do not only allow the observation of a behaviour of the target object when it already has started but give information on the traffic scene in which a future movement behaviour shall be predicted.

Indirect indicators provide variables, which are already observable before the to be predicted future movement behaviour starts. We define indirect indicators as the set of all possible indicators without the set of direct indicators.

From the calculated probabilities for future movement behaviour of the target object, it is possible to recognize traffic situations that make a particular behaviour of the target objects likely to happen.

Publication by Bonnin, S; Weisswange, T.; Kummerich F. and Schmuedderich, J.: General behaviour prediction by a combination of scenario-specific models, in: IEEE transactions on intelligent transportation systems, volume PP, issue 99, pages 1-11: IEEE 2014, ISSN 1524-9050 discusses a combination of general specific classifiers to improve quality and scope based on a concrete implementation for lane-change prediction in highway scenarios.

One problem of such approach as followed in reference EP 2 562 060 A1 is that for context-based prediction only the current situation of the traffic situation of the host vehicle is taken into consideration. Thus, at a particular point in time the context-based prediction may for example give the result that a target vehicle which is on a neighboring lane will cut in the lane of the host vehicle because the target vehicle quickly approaches a predecessor vehicle driving on the same lane as the target vehicle. According to EP 2 562 060 A1, this will result in deceleration of the host vehicle, because in such a situation it is likely that the target vehicle will cut in to overtake the slower predecessor vehicle.

But the traffic scene that is the basis for such estimation can be characterized by further characteristics. The road on which the host vehicle as well as the target vehicle are travelling might either be crowded due to many vehicles cruising only at minimum inter-vehicle distances into the same driving direction, or might alternatively only be populated by a small number of vehicles cruising with large inter-vehicle distances.

The known context-based prediction nevertheless provides results independent from any traffic density.

An example of a situation where the known context-based prediction comes to its limits shall be explained with reference to FIGS. 1A and 1B.

In FIGS. 1A and 1B the behaviour of a vehicle A as a target vehicle is to be predicted. The vehicle A approaches vehicle B also driving on the center lane of a road with multiple lanes, wherein vehicle B is cruising with a velocity smaller than the velocity of vehicle A. Throughout the annexed figures the length of solid line arrows indicate the current velocity of the respective vehicle. A behaviour prediction for vehicle A as the target vehicle in the illustrated situation of approaching its predecessor determines a gap on the left line of the three-lane road, but the gap does not fit well, as a vehicle E (host vehicle) at the rear end of the gap is approaching with a velocity significantly larger than the velocity of the target vehicle A.

In FIG. 1A the road is crowded by many vehicles at only small inter-vehicle distances driving into the same direction as vehicle A. Vehicle A is shown to change lane in front of host vehicle E, although the determined gap is relatively small. However, a driver of vehicle A presumably will not see better future chances for changing to the left lane instead of decelerating and thus the probability of a lane change even into a relative small gap increases.

In FIG. 1B the traffic scene shows only some vehicles at generally large inter-vehicle distances, the vehicles driving into the same direction as vehicle A. Vehicle A is shown to change lane behind host vehicle E, but the sparsely populated road enables to proceed as depicted contrary to the scene depicted in FIG. 1A.

In the state of the art prediction system, a predicted behaviour of a target vehicle is estimated to be different, when the local context of the traffic situation is different. The local context is different if at least one of the other traffic participants (meaning not the host vehicle E or target vehicle A) or the recognized infrastructure in the ego-vehicle's direct vicinity is different. For example other traffic participants such as predecessor vehicles differ or a highway has an entrance or exit in the surroundings taken into account. Accordingly the available situation models for a context-based prediction are activated or selected for example based on

- a predicted behaviour applicable in the detected scene, such as "cut-in" or "cut-out", or
- a detected constellation of traffic participants, e.g. two vehicles on a neighbouring lane, or
- a recognized infrastructure elements, e.g. a highway entrance in driving direction.

However although the recognized elements define a same situation, the driving behaviour of a real driver of a target vehicle might nevertheless differ. So in FIG. 1A the target vehicle A will change from the center lane to the left lane despite the gap fitting badly due to the fact that the driver is aware of a highly crowded highway and the probability of a better fitting gap is only low. If the highway is almost empty the same traffic situation of vehicles A, E and B with their respective velocities and spatial distribution according to FIG. 1B, the driver of vehicle A will most probably wait for a more suitable gap to change lane. However when taking the traditional predictive movement behaviour methods into consideration, in both cases shown in FIGS. 1A, 1B either a cut-in or no cut-in is predicted, as for both cases the local context of the prediction for the behaviour of vehicle A is the same. However the target vehicle A will act differently in the situations depicted in FIG. 1A and in FIG. 1B.

Similar problems as discussed with respect to traffic density and behaviour prediction arise with respect to general speed limits in countries or with a state of the road, e.g. if a road is icy. The implications will be discussed in more detail with respect to FIGS. 2A, 2B, 3A, and 3B later.

Therefore an inaccuracy in predicting the target vehicle's behaviour inherent to state of the art context-based prediction systems is to be stated.

According to the existing proposals, only the local context of the actual traffic situation is taken into consideration when estimating a future behaviour of target objects. The quality of the recommended action of the prediction of a prediction system is therefore limited.

SUMMARY

Hence it is an object of the invention to provide a method capable of improving the quality of the prediction result of a prediction system.

The invention solves the above problem by the method, system, vehicle and program according to the independent claims.

The method for assisting a driver of a vehicle solving the technical problem uses a vehicle comprising at least one data acquisition means and a processing means, the method comprising steps of acquiring data describing a traffic environment of a target vehicle by the data acquisition means, generating prediction information based on the acquired data and outputting the prediction information. The inventive method is characterized in further generating global scene context data from the data describing the traffic environment and processing the global scene context data in order to generate a prediction adaptation information, wherein in the step of generating the prediction information, the prediction information is adapted based on the prediction adaptation information.

The method provides the effect of outputting a prediction information for a target vehicle which combines the prediction based on direct and/or indirect indicators with an estimation of the global scene context of the traffic situation. The global scene context is defined as a context which is valid for all traffic participants in a traffic scene which forms the basis for a behaviour prediction. The traffic scene according to the prior art analyzes a constellation of traffic participants and will not differ traffic scenes according to global restrictions. Contrary thereto, the inventive method further processes the data acquired by the prediction system and generates prediction adaptation information in order to generate an adapted prediction information taking into account also parameters globally valid for all traffic participants for generating a future movement behaviour prediction for a target vehicle with the capability to further differentiate traffic situations in different traffic scenes. The approach according to prior art lacks the capability to differ between situations or situation models based on global criteria. The quality of the behaviour prediction is therefore increased in the claimed method.

The method for assisting a driver of a host vehicle includes in a preferred embodiment that in the step of generating global scene context data at least one of the following steps including estimating a global scene context from sensor data acquired by at least one local sensor mounted on the vehicle, estimating the global scene context from externally received data, and estimating the global scene context from data received via a traffic broadcast service is performed.

The introduction of scene context data and generation of prediction adaptation information based thereon improves the data basis for the prediction significantly and enables to introduce advantageously the awareness of the prediction system with respect to general aspects and general restraints for the prediction computation and prediction result judgment. Information content from traffic broadcast services and car-to-car and car-to-infrastructure is therefore integrated into behaviour prediction and the database for the prediction decision expanded.

Advantageously in the step of estimating a global scene context from sensor data, the global scene context data is generated by the at least one sensor logging at least one of a behaviour of other vehicles and determination of a traffic state from the logged behaviour, the vehicle's state, like average velocity, number of vehicles and the like is performed. Therefore maximum benefit is achieved from sensor data acquired for example by cameras on board of the host vehicle for improving the quality of the prediction computation and the reliability of the prediction result In an embodiment of the method in the step of processing the global scene context data, at least one of generating the prediction adaptation information configured to change a prediction calculation in a situation model of a context-based prediction, and generating the prediction adaptation information configured to modify a probability in a result from at least one of a context-based and a physical prediction is performed. The prediction adaptation information according to this embodiment is therefore advantageously suited to adapt the parameters influencing the processing, the processing steps, the processing results of the context-based prediction, the processing results of the physical prediction respectively or in combination. Therefore the prediction system is capable to implement the most effective method of prediction processing regarding the global context data to be considered.

Advantageously in the step of processing the global scene context data in order to generate a prediction adaptation information at least one of generating at least one scaling parameter for modifying at least one indicator value of an indicator in a situation model of a context-based prediction system, wherein each scaling parameter corresponds to exactly one indicator based on the global scene context data, and generating prediction adaptation information configured to directly adapt a result of the context-based prediction system is performed.

In a preferred embodiment of the claimed method, in the step of generating the prediction information, a context-based prediction step using indirect indicators and a physical prediction step using direct indicators for validating a result of context-based prediction is performed.

The technical problem is also solved by a system for assisting a driver of a vehicle, wherein the system comprises at least one data acquisition means configured to acquire data which describes a traffic environment, and a processing means configured to generate prediction information based on the acquired data and to output the prediction information. The system is characterized by the processing means being configured to generate global scene context data from the data describing the traffic environment, and by the processing means being configured to process the global scene context data in order to generate a prediction adaptation information. The processing means is configured to adapt the prediction information based on the prediction adaptation information.

The system for assisting a driver of a vehicle advantageously comprises the processing means including a global scene context estimation unit configured to generate global scene context data by performing at least one of estimating a global scene context from sensor data acquired by at least one local sensor mounted on the vehicle, estimating the global scene context from externally received data, and estimating the global scene context from data received via a traffic broadcast service.

An embodiment the system for assisting a driver of a vehicle further includes the global scene context estimation unit to be configured to generate the global scene context data by the at least one sensor logging a behaviour vehicle's state, of other vehicles and determining a traffic state from the logged data.

Further it is advantageous when the system for assisting a driver of a vehicle includes processing means which comprises a converter unit configured to convert the global scene context information to a prediction adaptation information by at least one of generating the prediction adaptation information configured to changing a prediction calculation in a situation model of a context-based prediction, and generating the prediction adaptation information configured to modify a probability in a result from at least one of a context-based and a physical prediction.

In an embodiment of the system for assisting a driver of a vehicle according the system is characterized by the processing means comprising a converter unit configured to convert the global scene context information to a prediction adaptation information by at least one of generating at least one scaling parameter for modifying at least one indicator value of an indicator in a situation model of a context-based prediction system, wherein each scaling parameter corresponds to exactly one indicator based on the global scene context data, and of generating a prediction adaptation information configured to directly adapt a result of the context-based prediction system.

In an advantageous embodiment the system for assisting a driver of a vehicle includes the processing means comprising a prediction system configured to generate the prediction information, wherein the prediction system comprises a context-based prediction unit configured to generate a context-based prediction information based on indirect indicators, and a physical prediction unit configured to generate the prediction information based on direct indicators and to validate the context-based prediction information.

The technical problem is solved by a vehicle including a driver assistance system with the features as discussed above wherein the driver assistance system is configured to influence control of the vehicle based on output signals of the driver assistance system.

The method may advantageously be implemented as a computer program with program-code means for executing the method steps according to any one of the embodiments of the invention, when the program is executed on a computer or digital signal processor. The invention may also be implemented as computer program-product with program-code means stored on a machine-readable medium for executing the method steps any one of the embodiments of the invention, when the program is executed on a computer or digital signal processor.

BRIEF DESCRIPTION OF THE DRAWINGS

The inventive method and system are explained in more detail with reference to the attached figures, wherein FIG. 4 shows an overview over the inventive driver assistance system, FIG. 7A depicts a traffic scenario with predicted future movement behaviour of the target vehicle according to an embodiment of the invention, FIG. 7B depicts a traffic scenario with predicted future movement behaviour of the target vehicle according to an embodiment of the invention.

DETAILED DESCRIPTION

Figure 1A:
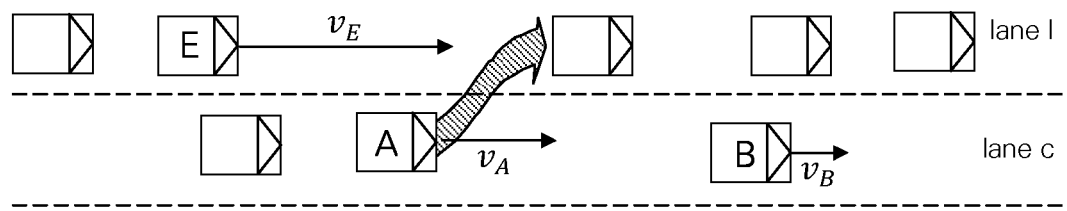
FIG. 1A depicts a first traffic scenario with a first predicted future movement behaviour of the target vehicle.

In the figures same numerals denote the same elements and a description of the same elements is not necessarily repeated in the following description of the figures.

The method according to the invention assumes to be performed on or by the host-vehicle or a respective computing system on board of the host-vehicle being equipped with one or more sensors providing data to an acquisition means of the host-vehicle.

The computing system relates to a system for performing the necessary computing or calculation operations. This system may be specially constructed for this purpose, or it may comprise at least a general-purpose computer selectively activated or reconfigured by a computer program stored in the computer. The computing system can also consist of a network of identical or different processors for executing the respective tasks.

A computer program and data required for its execution may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computer referred to may include a single processor or may be architectures employing multiple processor designs, signal processors etc. for increasing the computing capability.

The computing system is especially functionally connected to the at least one sensor. The inventive method can be applied in form of a computer program. It can be stored on a computer readable medium and is executed when run on the computing system.

A sensor can be for example an optical sensor such as a camera, a laser scanner, an infra-red camera, or an acoustical sensor, such as an ultrasonic sensor. The sensor may also be a radar sensor using electromagnetic waves for sensing a coverage area. A combination of one or more of the sensors cited might also be advantageously employed on board of the host vehicle.

In addition the sensor can be configured to detect road infrastructure elements, such as traffic-lights, signs, and road/lane markings. The at least one sensor is also configured to estimate their location and state, where the definition of a state depends on the type of infrastructure element. There are known approaches for the skilled person for detecting traffic signs, etc. based on camera-images and/or navigation-data.

For easily understanding the invention the term sensor is used throughout the description but it is evident that any information regarding this sensor also regards any type of data source which is capable of providing the relevant information to the acquisition means of the system. Such acquisition means can acquire data from a sensor or a plurality of sensors, any element or unit configured to receive messages from inter-vehicle communication (car2car-, car-to-car-communication), from infrastructure (car2X-, car-to-infrastructure-communication) and/or to estimate other vehicle's positions, velocities, accelerations, and further state parameters. The acquisition means can receive messages from infrastructure-communication to estimate position and state of road environment.

The at least one sensor is especially configured to estimate the target vehicle's position, velocity, and acceleration.

Of course it is also possible to use different and specific sensors for some or all of the above tasks. E.g. a global navigation satellite system (GNSS) can be used for obtaining position information, while an accelerometer can be used to get information on the acceleration. Also a plurality of visual and/or acoustical sensors can be used to obtain information on the environment of the host-vehicle, e.g. to determine the positions of the other traffic participants and/or the state of the road infrastructure elements.

Examples for position rendering systems include GALILEO, GPS (global positioning system), GLONASS, COMPASS. Other navigational systems are based on inertial navigation (dead reckoning), basing the process of calculating a host vehicles current position on using a previously determined position, and advancing that position based upon known or estimated speed over an elapsed time and driving direction.

An estimation of the global scene context can also be based on data acquired via car2car or car2x communication.

Traffic broadcast services are suitable to provide valuable input data, e.g. about traffic density, and global data from various sources about accidents, road construction work and other potential traffic obstacles influencing the traffic flow and thereby also the global scene context.

Further information is to be acquired from on-board or off-board databases and navigational aids. Cartographic information like road maps, or weather information in conjunction with positional information and position tracking information is also a valuable source of traffic environment information.

The individual elements of the traffic environment can also include information on traffic density. These may origin either from a dedicated traffic message channel (TMC), which provides coded traffic information using radio data services (RDS), or by GSM/GPRS/3G data transmission via cellular mobile communication systems or the like. TMC is a technology for delivering traffic and travel information to motor vehicle drivers. It is digitally coded, using the radio data system on conventional FM radio broadcasts. It can also be transmitted on digital audio broadcasting (DAB) or satellite radio.

The invention addresses the general problem of the host vehicle requiring a prediction of a future behaviour of other relevant traffic participants in the surrounding traffic environment of the host vehicle.

To estimate a future behaviour of a target object, the probability for the target vehicle to perform one of a set of possible future movement behaviour s is estimated by the context based prediction as explained below. Of course such estimation can be performed for any traffic object as target object for which a sufficient database may be achieved by the at least one sensor.

In FIG. 4 an overview over the entire advanced driver assistance system 1 comprising a prediction unit 2 used for predicting a future movement behaviour of at least one target object and including global scene context (GSC) unit 3 according to the invention is given. The advanced driver assistance system 1 comprises a data acquisition means 4. As shown in the FIG. 4 the data acquisition means 4 acquires data 10 related to (or describing) a traffic environment of the host vehicle from one or more sensors, 6.1, 6.2, 6.3 . . . . The sensors 6.1, 6.2, . . . may be of different types or may be of the same type and can in particular be mounted on the host vehicle such that in particular the driving direction of the host vehicle can be observed. The sensors 6.1, 6.2, 6.3, . . . are configured to measure the relative speed, position or any other variable that allows to determine the relation between traffic participants or may be configured to detect road infrastructure elements.

The data acquisition means 4 can acquire data relating to the traffic environment 10 also from sources such as car-to-car, car-to-infrastructure communication means 7, radio traffic service receivers 8, car navigation means 9, GNSS receiver 5 or any other interface to external or internal (on-board) sources for individual information elements of the traffic environment of the host vehicle.

The acquired data describing the traffic environment is provided to a prediction system unit 2. The prediction system unit 2 will be discussed in detail with reference to FIG. 5 below.

The prediction system unit 2 provides a prediction information 15 to a vehicle actuation means 17 and causes either directly actuating on the basis of the prediction information 15 or by means of a controlling unit not shown in FIG. 4. Typically, an actuation signal generated based on the prediction information is used for performing throttle control and/or brake control. Furthermore, additionally or alternatively, the actuation signal causes either a driver warning for information to be performed in a respective driver warning means 16 which may be for example in the simplest case a signal light.

Figure 5:
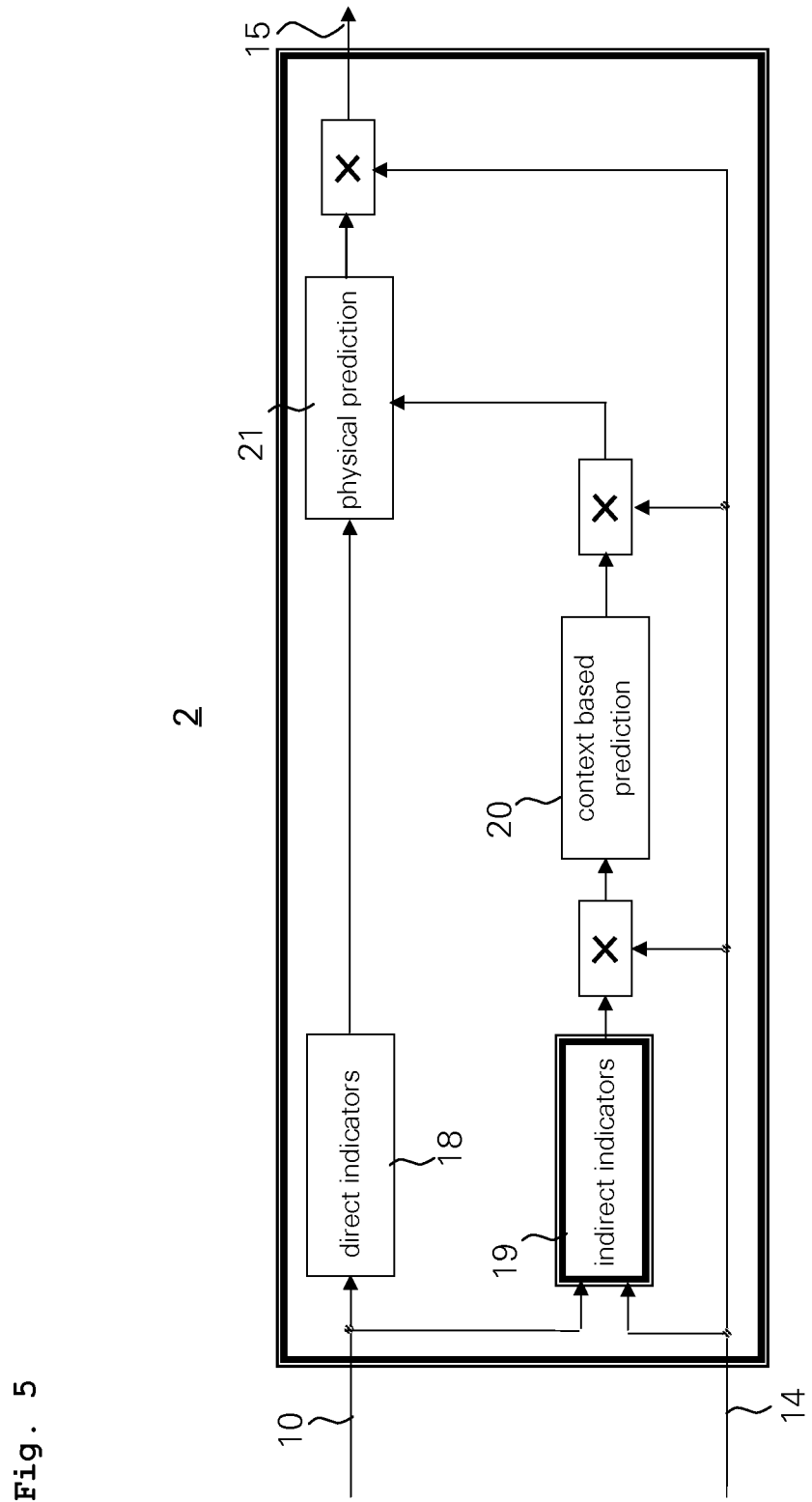
FIG. 5 depicts a schematic for generating a prediction signal in a prediction system according to the invention.

The prediction system unit 2 as shown in FIG. 5 comprises a direct indicator calculating unit 18 for calculating direct indicators on the basis of the data related to the traffic environment 10 that is acquired by the data acquisition means 4. The data describing the traffic environment 10 contains information about position, speed, . . . that is acquired by the data acquisition unit 4 and is further provided to a indirect indicator calculation unit 19 for calculating indirect indicators for the context-based prediction. These indirect indicators may comprise conventionally calculated indirect indicators which are calculated from the signals of sensors 6.1, 6.2, 6.3 in the indirect indicator calculation unit 19. For the discussion of indicator calculation and performing behaviour prediction of traffic objects reference is made to the document EP 2 562 060 A1, which is hereby incorporated by reference.

The direct indicators are supplied to a physical prediction unit 21 and the indirect indicators are supplied to a context-based prediction unit 20. The result of the context-based prediction calculation is then fed to the physical prediction calculation unit 21 for example for validation reasons and plausibility check as it is in detail explained in EP 2 562 060 A1 which is therefore explicitly referred to. In the end, the prediction information 15 is output by the prediction system unit 2 that causes either a driver warning for information to be performed in a respective driver warning unit 16. Furthermore, additionally or alternatively, the signal is supplied to a vehicle actuation unit 17 that might be either directly actuated on the basis of the signal or by means of a controlling unit that receives a signal provided by the prediction system unit 2 as an input. Typically, the output signal is used for throttle control and/or brake control.

Before the details of the invention are now explained, the context-based prediction as far as considered relevant for the understanding of the invention is explained.

Context based prediction consists of a set of classifiers $$\Gamma^b = \{\gamma_j^b\}_{j=1} \ldots N_t \quad (1)$$

wherein each classifier $\gamma_j^b$ estimates a probability $$p(b_i^{t+\Delta t}|x_i^t, S^t, \gamma_j^b) \quad (2)$$

that a target vehicle $x_i^t$ will execute behaviour $b \in B$ at a time $t+\Delta t$. For each behaviour b a different set of classifiers can be used. Here B includes for example the behaviour $$B = \{\text{lane-change-left, lane-change-right, follow-lane}\}. \quad (3)$$

A feature-vector $f_{ji}^{bt}$ is computed for each $x_i^t$ and each classifier $\gamma_j^b$ based on the indirect indicators, where $$f_{ji}^{bt} = (f_{ji1}^{bt}, \ldots, f_{jiN_j}^{bt})^T \quad (4)$$

$$f_{jik}^{bt} = \tau_k(x_i^t, S^t) \quad (5)$$

with $\tau_k(\cdot) \in I_j^j \subset I_I \quad (6)$

The probability of $x_i^t$ performing behaviour b at time t+Δt is the estimate:

$$p(b_i^{t\to\Delta t}|x_i^t,S^t) \propto \Sigma_{j=1}^{Nb}\omega_j p(b_i^{t\to\Delta t}|X_i^z,S^t,\gamma_j^b) \quad (7)$$

$$p(b_i^{t+\Delta t}|x_i^t,S_t,\gamma_j^b) = \gamma_j^b(f_{ji}^{bt}) \quad (8)$$

Equations (7), (8) define that for each behaviour, the probability is estimated by a weighted combination of set of multiple classifiers, each classifier using a different set of indicators.

No direct indicators need to be used in order to allow for early prediction before the start of the behaviour.

Accordingly the context based prediction is capable of determining the class of the future behaviour, but not the concrete execution in terms of time and space of the movement of $x_i^t$. In other words, the context based prediction can estimate the probability of each behaviour b∈B to happen roughly at time t+Δt but the exact Δt and position $p_{t,x}^{t+\Delta t}$, $p_{t,z}^{t+\Delta t}$ at time t+t of $x_i^t$ are unknown.

Additionally or as an alternative to a context based prediction that does not use any direct indicators as described above, a classifier could be used, which dynamically includes direct and indirect indicators based on the prediction time Δt. For example, the classifier could use indirect indicators for Δt≤2s and could fade to direct indicators for Δt<1s.

Examples of situations where the known context-based prediction comes to its limits shall be explained.

Figure 1B:
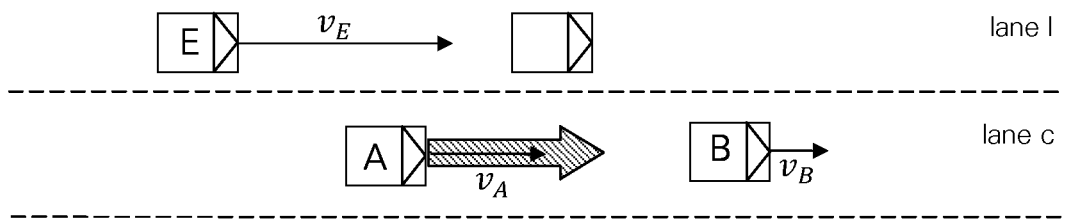
FIG. 1B depicts a second traffic scenario with a second predicted future movement behaviour of the target vehicle.

FIGS. 1A and 1B are already discussed in the introductory portion of the document. A typical example of a situation where the known context-based prediction does not provide entirely satisfying results is discussed with reference to FIGS. 1A and 1B.

Vehicle A of FIGS. 1A, 1B is assumed to represent a target vehicle whose future movement behaviour is to be estimated. Vehicle A approaches vehicle B also driving on the center lane of the highway, wherein vehicle B is cruising with a velocity smaller than the velocity of vehicle A. The context based behaviour prediction determines a gap on the left lane of the multiple lane road, but the gap does not fit well for vehicle A, as host vehicle E is approaching with a velocity significantly larger than the velocity of the target vehicle A.

In FIG. 1A the road is crowded by many vehicles at only small inter-vehicle distances the vehicles driving into the same direction as vehicle A. Vehicle A is shown to change lane in front of host vehicle E, although the determined gap is not entirely satisfying due to not exactly fitting for a lane change.

In FIG. 1B the traffic scene shows only some vehicles at generally large inter-vehicle distances driving into the same direction as vehicle A. Vehicle A is shown to change lane after host vehicle E has passed, but the sparsely populated road enables to proceed as depicted.

But based on the conventional predictive movement behaviour methods, in both cases shown in FIGS. 1A, 1B the same behaviour for vehicle A is predicted, as for both cases the local context of the prediction for the behaviour of vehicle A as a target vehicle is the same. Therefore the conventional context based prediction considers both situations to be identical and provides identical behaviour predictions for the situation depicted in FIGS. 1A and 1n FIG. 1B. However the target vehicle A will most probably act differently in the situation depicted in FIGS. 1A and 1n FIG. 1B. Therefore an inaccuracy in predicting the target vehicle's behaviour inherent to state of the art context-based prediction systems is to be stated.

Figure 2A:
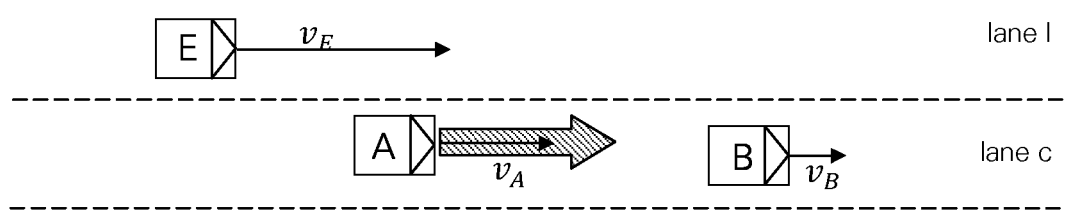
FIG. 2A depicts a third traffic scenario with a third predicted future movement behaviour of the target vehicle.
Figure 2B:
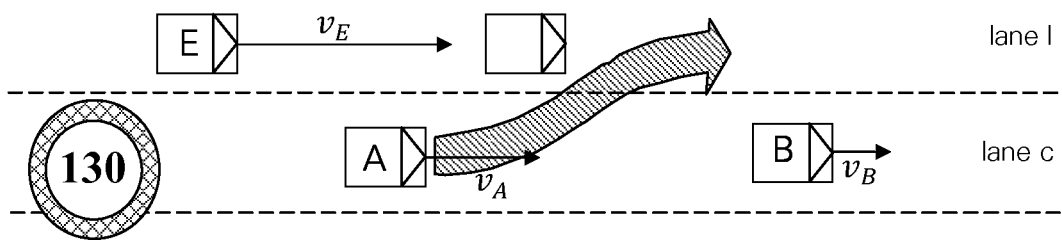
FIG. 2B depicts a fourth traffic scenario with a fourth predicted future movement behaviour of the target vehicle.

FIGS. 2A and 2B show an other example where the limitation of previously known context-based prediction becomes obvious. Vehicle A as target vehicle approaches vehicle B. Both vehicles A and B are travelling on the center lane c of a multiple-lane road. Vehicle A might change from the center lane c to the left lane 1. A fitting gap in front of vehicle A is determined to exist on the left lane 1.

However in the situation depicted in FIG. 2A there is no global speed limit and vehicle A takes into consideration a possibly high velocity of vehicle E and accordingly does not change from the lane c to the lane 1.

In the situation depicted in FIG. 2B the same local traffic constellation as in FIG. 2A is depicted. The significant difference in the situation is a global speed limit denoted by the speed limit label "130" in FIG. 2B and the fact that the vehicle A is exceeding this speed limit. In the situation in FIG. 2B, the context-based prediction system predicts a lane change maneuver for target vehicle A in response to the vehicle's A velocity $v_A$ exceeding the velocity of the vehicle B's velocity $v_B$. Here the driver of target vehicle A will consider that vehicle E also has to observe the speed limit and thus does not approach from behind too quickly.

The conventional context-based predictive systems are ill-suited to detect the difference between the respective scenes in FIGS. 2A and 2B and would accordingly either predict a cut-in of the target vehicle A for both scenes or predict a no-cut in for the situations in FIGS. 2A and 2B, as the conventional approach would decide on the same situation.

Figure 3A:
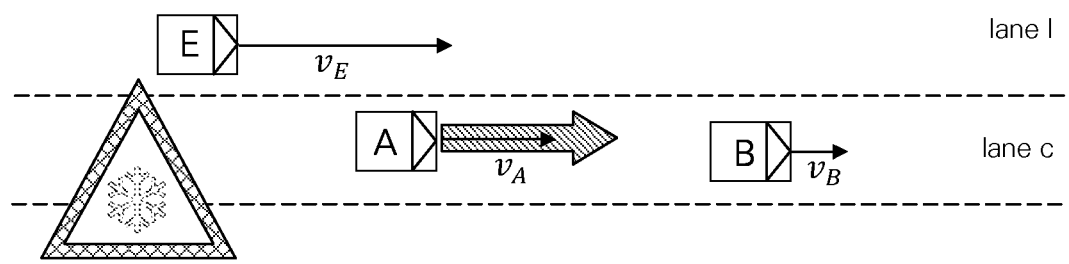
FIG. 3A depicts a fifth traffic scenario with a fifth predicted future movement behaviour of the target vehicle.
Figure 3B:
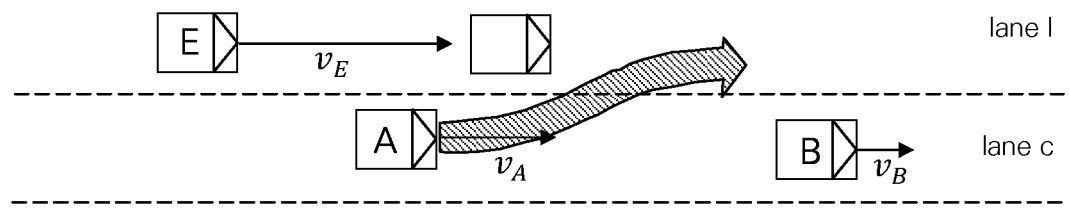
FIG. 3B depicts a sixth traffic scenario with a sixth predicted future movement behaviour of the target vehicle.

FIGS. 3A and 3B show a further example where the limitation of previously known context-based prediction is to be stated.

The situation of FIGS. 3a and 3B shows target vehicle A travelling on the center lane of a road with multiple lanes and due to a higher velocity $v_A$ than a vehicle B cruising on the same lane c of the road with speed $v_B$, and is approaching vehicle B. A roughly fitting gap is determined to exist on the left lane 1.

In both cases of FIG. 3A and FIG. 3b showing an identical constellation of vehicles, the well-known approach of context-based prediction would predict either a cut-in or no cut-in depending on the values of the elements of the data describing the traffic environment 10 and thresholds to be taken into account for the behaviour prediction. It would be make no difference in the state of the art approach between FIG. 3A and FIG. 3B, that in FIG. 3A the road surface is covered by ice contrary to the road surface being plain and dry in case o FIG. 3B.

Taking the global context according to the invention into consideration, the vehicle A in FIG. 3A would have to be predicted not to change from lane c to lane 1 as indicated by the arrow, as any lateral acceleration would increase the probability of losing control over the vehicle, whereas in FIG. 3B taking the good road conditions into account, a driver of the vehicle 3B would with a high probability begin a lane change maneuver, so that a cut-in situation for the host vehicle E arises.

Hence also the exemplary situations shown in FIGS. 3A and 3B emphasize the limits of the previously known context based predictive systems for behaviour prediction. While the situation of FIG. 3A has been described by reference to an icy road, any other specific surface characteristic might lead to a similar result, such as rain, snow, mud, spilled oil or general differences in road surface.

Now the integration of global scene context information into the prediction system according to the invention is explained in more detail with reference to FIGS. 4 to 6.

In FIG. 4 the data acquisition means 4 acquires data describing a traffic environment. Besides supplying the data describing a traffic environment 10 of the host vehicle to the prediction system unit 2, the data describing a traffic environment is also provided to a global scene context estimation unit (GSC estimation unit) 11. The GSC estimation unit 11 processes the data and generates global scene context information (GSC information) 12 based on the data describing the traffic environment 10.

The GSC estimation unit 11 according to an embodiment is configured to analyze the individual elements of the input data describing a traffic environment 10 in order to determine a global scene context. For example the GSC estimation unit 11 can analyze the velocity of all traffic participants which are recognized by the sensors 6.1, 6.2, . . . and decide if a global speed limit for vehicles is to be determined. For example the GSC estimation unit 11 can combine positional information for the host vehicle acquired by the GNSS with on-board stored map information resp. weather information acquired via a broadcast service to decide on bad road conditions due to heavy weather. Via data acquired from the car-to-infrastructure communication receiver 7 an ice-covered strip of road ahead of the target vehicle might be identified and hence a GSC information 12 element "icy road" be generated and output by the GSC estimation unit 11.

The GSC information 12 is supplied to a global scene context converter unit (GSC converter unit) 13 for processing and generating a prediction adaptation information 14 for the prediction system unit 2.

The GSC converter unit 13 is configured to derive from the estimated GSC information 12 received from the GSC estimation unit 11, specific information how to modify the prediction information and/or the generation of the prediction information in the prediction system unit 2 in order to take account of the global scene context as estimated by the GSC estimation unit 11 and provided to in the GSC information 12. The prediction adaptation information 14 output by the GSC converter unit 13 can for example include parameters for directly modifying results of the behaviour prediction steps in the prediction system unit 2. In particular the results of a context-based prediction step may be adapted to the global scene context. The prediction adaptation information 14 can also include adapting the results of the physical prediction step to the global scene context. The adaptation of the results may for example be done by multiplying probability values included in a prediction result with a multiplier signaled via the prediction adaptation information to the prediction system. The adaptation of the behaviour prediction can also comprise modification of indicator values in the situation models used in the context-based prediction in accordance with values transmitted in the prediction adaptation information.

Figure 6:
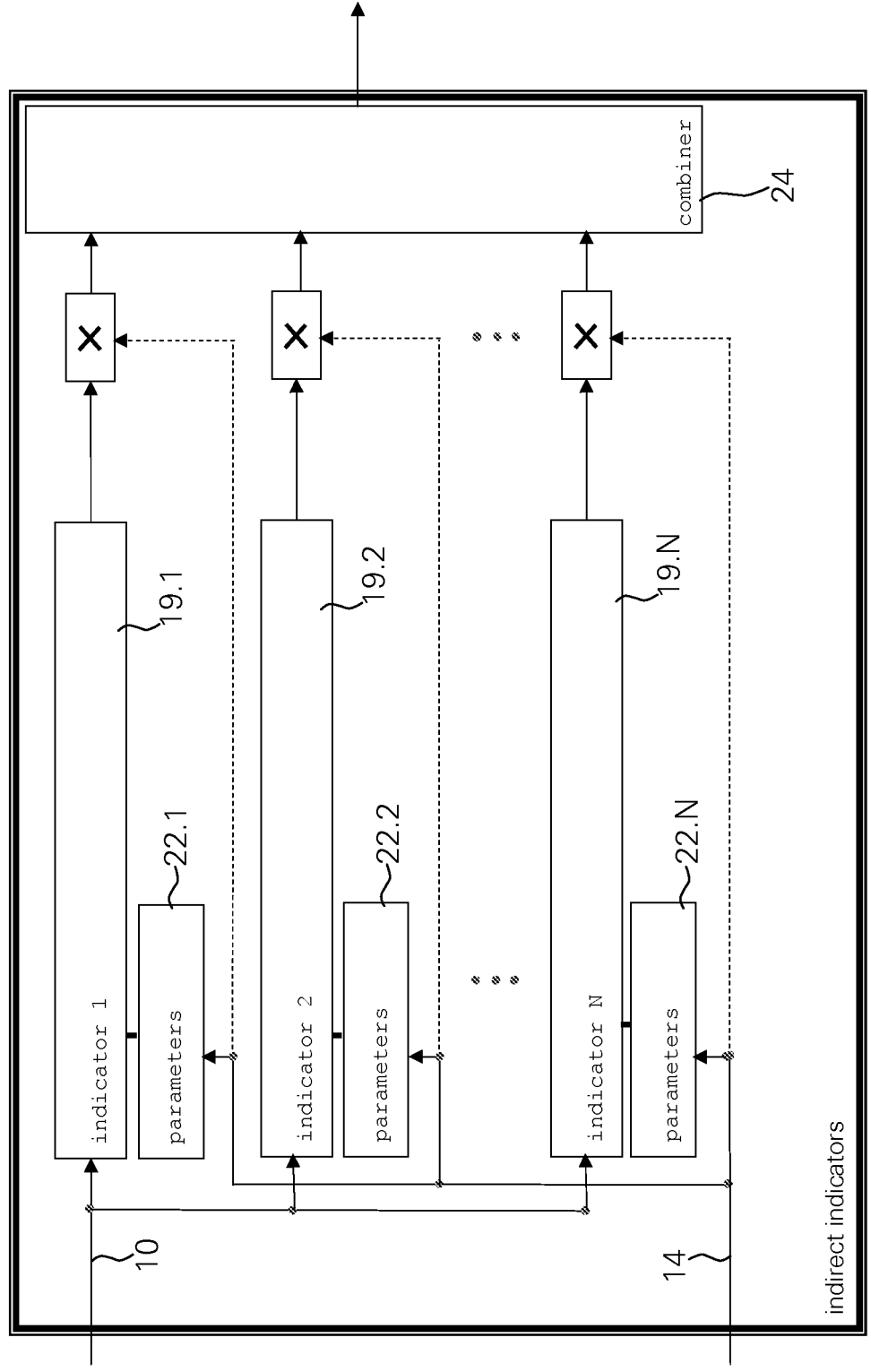
FIG. 6 depicts a schematic for generating indirect indicators in a prediction system according to the invention.

FIGS. 5 and 6 further denote the possibilities for adapting the indicator values of the indirect indicators in the indirect indicator calculation unit 19. In FIG. 6 two implementations of adapting (or modulating) the indicator values are given as either adapting the parameters used for the computation of the indicators in the indirect indicator calculation unit 19 or directly scaling the indicator values output by the indirect indicator calculation unit 19 before combining the adapted indicator values and providing the adapted and combined indicator values to the context-based prediction calculation unit 20.

In FIGS. 7A, 7B, 8 and 9 an example of global scene context estimation in a system for predicting movement behaviour of a traffic vehicle according to an embodiment of the invention is given. The situation in FIGS. 7A and 7B depicts a road scene on two lanes of a highway having multiple lanes. The scene in FIG. 7A differs from the scene shown in FIG. 7B by FIG. 7A having a high traffic density while the scene in FIG. 7B is characterized by mild traffic. The local constellation of the vehicles A, B and E with their respective velocities $V_A$, $V_B$ and $V_E$ corresponds to the scenes as shown in FIGS. 1A and 1B.

Figure 8:
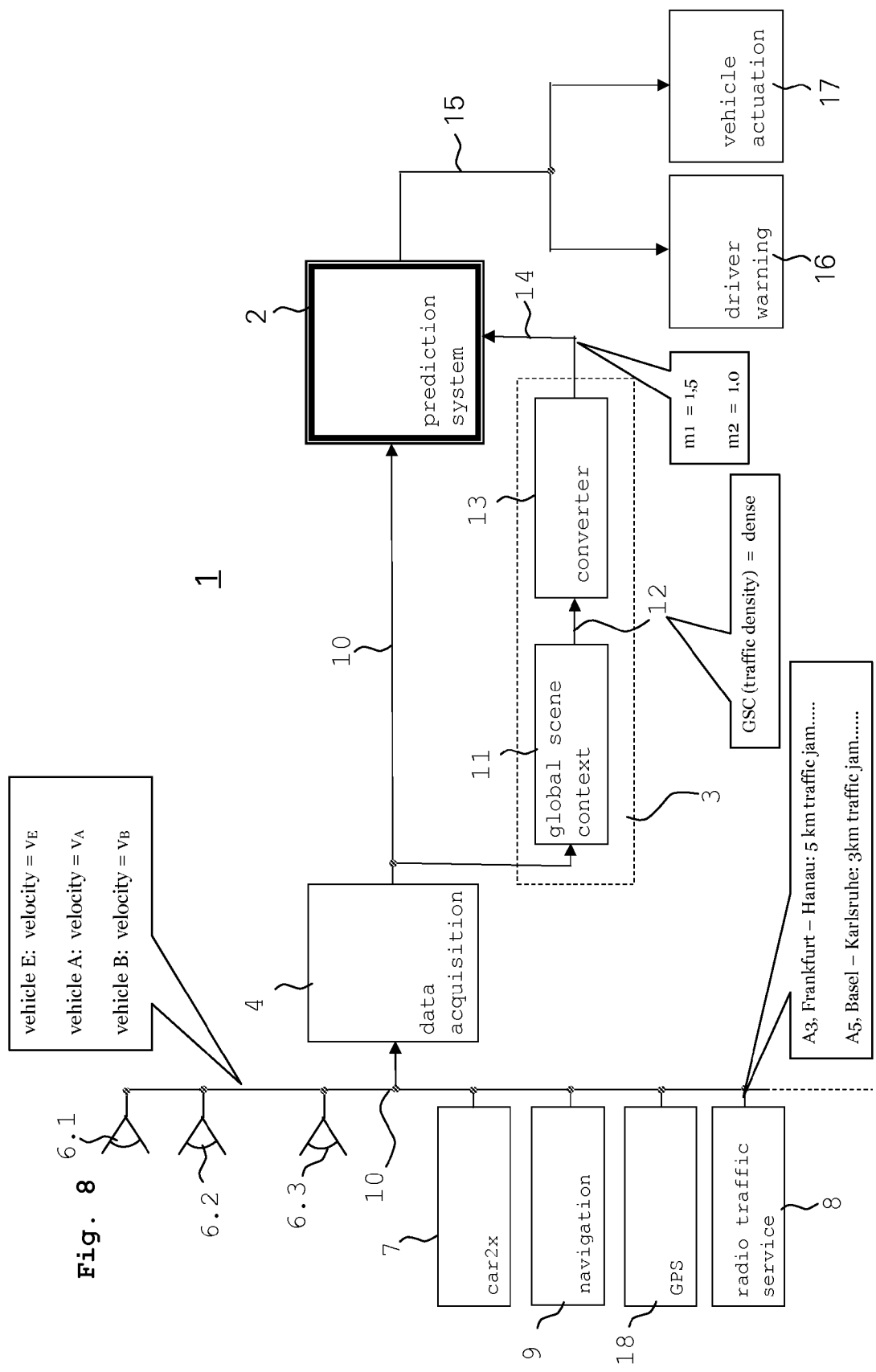
FIG. 8 depicts a schematic for generating a prediction signal in a prediction system according to an embodiment of the invention.

The method for predicting movement behaviour according to an embodiment of the invention for the FIG. 7A is depicted in FIG. 8. In FIG. 8 a message from a radio traffic service 8 is received and relayed to the data acquisition unit 4 for further processing. This message is assumed to refer to a traffic jam in a specific road section of a public highway. The cited road section is assumed to include the scene in FIG. 7A.

The data acquisition unit 4 further acquires positional information and navigation information including map information and provides the acquired elements of data describing the traffic environment 10 to the GSC estimation unit 11. The GSC estimation unit 11 processes the acquired data describing the traffic environment 10 and by linking the individual elements "radio traffic message", "positional information" and "navigation information" of the data describing the traffic environment 10 estimates (determines) the global scene context to suggest a high traffic density for the current location of the target vehicle. The global scene context estimation unit 11 according to an embodiment further acquires sensor data of the sensors 6.1, 6.2, 6.3 revealing the number and the speed of the other traffic participants surrounding the target vehicle. The sensor data can in one embodiment further be averaged over time in a processing step in order to increase significance of the processed traffic data. The GSC estimation unit accordingly is enabled to verify the suggested high traffic density by monitoring the surroundings of the target vehicle and to provide a verified global scene context information 11 reporting a high traffic density to the GSC converter unit 13.

The GSC converter unit 13 processes the GSC information 12 signaling a high traffic density in order to generate a set of scaling values to be enclosed in the prediction adaptation information 14. The prediction adaptation information 14 in the discussed embodiment comprises a set of scaling values (scaling parameters), wherein each scaling value corresponds to exactly one indicator 19.1, 19.2, . . . , 19.N as evaluated in the context-based prediction step as shown in FIG. 6. In FIG. 8 the global scene context estimation "high traffic density" results in a prediction adaptation information 14.1 including scaling values "m1=1.5" and "m2=1.0" and "m5=1.5" being provided from the GSC converter unit 13 to the prediction system unit 2.

Figure 9:
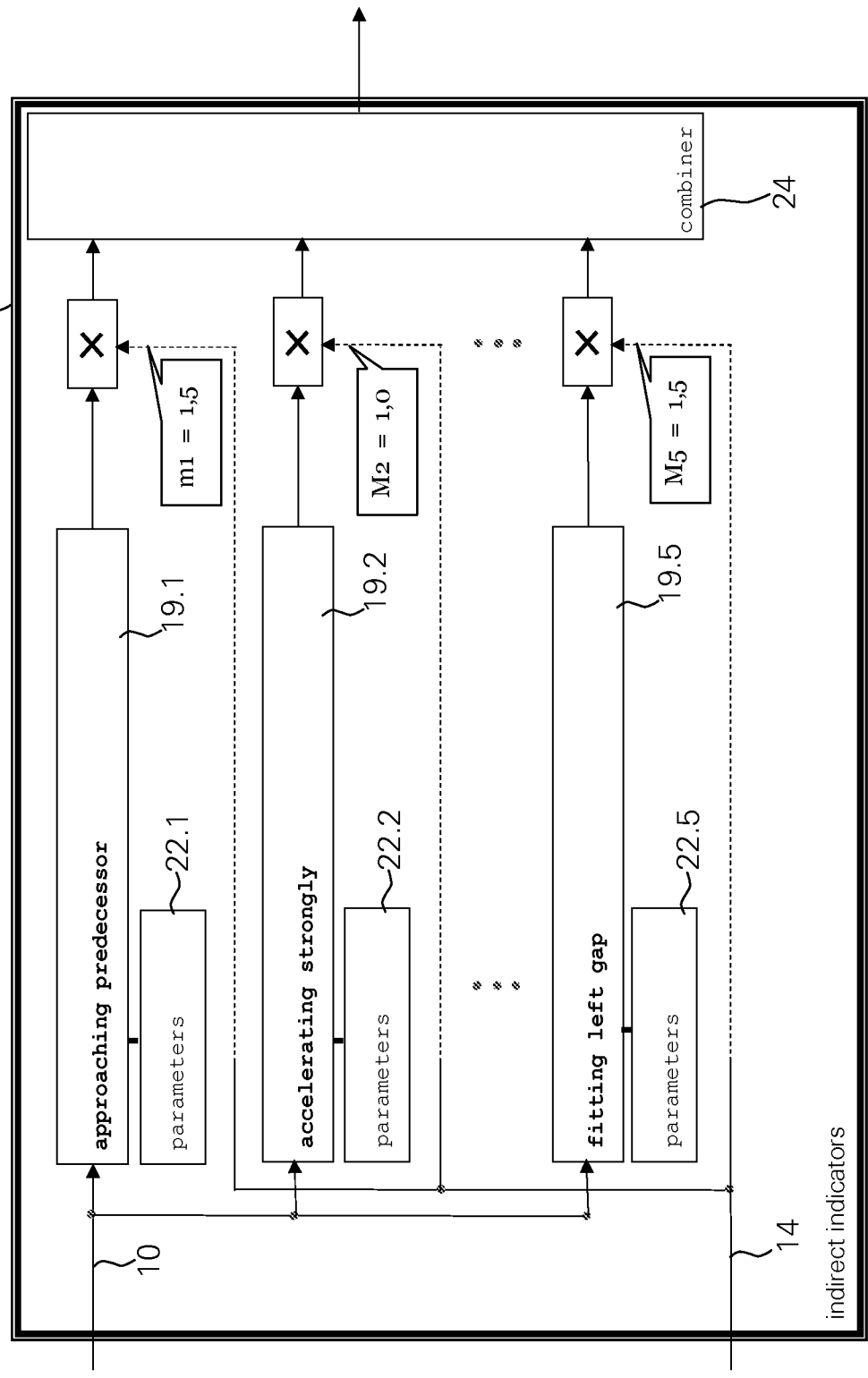
FIG. 9 depicts a schematic for generating indirect indicators in a prediction system according to an embodiment of the invention.

As depicted in FIG. 9 the indirect indicator calculation unit 19 of the prediction system unit 2 acquires the prediction adaptation information 14 and sets respective scaling parameters for the indirect indicators "approaching predecessor" 19.1 and "fitting left gap" 19.5 to a respective amplification of 1.5. The indirect indicator "accelerating strongly" 19.2 is left unchanged in accordance with the scaling value m2=1.0 included in the prediction adaptation signal. The respectively adapted (scaled) output values are then concatenated in the combiner 24 before supplying them to the context-based prediction unit 20 for further processing and finally generating of the prediction information 15 in the physical prediction calculation unit 21.

Amplifying the indirect indicators "approaching predecessor" 19.1 and "fitting left gap" 19.5 while maintaining the other indirect indicators in case of a high traffic density as global context results in an increased probability for predicting a lane change to the left lane 1 in the situation of FIG. 7A and therefore high prediction probability for a cut-in behaviour with respect to target vehicle A even when only relative small gaps are available for the target vehicle.

The contrary argumentation applies to the scene in FIG. 7B. In FIG. 8 the GSC estimation unit 11 estimates a mild traffic density. This global context estimation may result from a processing in the GSC estimation unit 11 verifying that neither a respective traffic message valid for the actual position of the target vehicle, nor a determined high traffic density based on signals from the sensors 6.1, 6.2, 6.3, ..., nor a high traffic density being communicated by neighboring vehicles is available. By either processing one of these elements of the data describing the traffic environment 10 or by processing a combination of these elements for increased reliability of the global scene context estimation performed in the GSC estimation unit 11, a global scene context of "mild traffic" is determined. The GSC converter unit 13 receives a respective GSC information 12 and generates a prediction adaptation information 13 setting the appropriate scaling values for the indirect indicators 19.1, 19.2, ... in the context-based prediction system unit 2. With reference to the situation of FIG. 7B as an example, this means decreasing a relative weight of the indirect indicators "approaching predecessor" 19.1 and "fitting left gap" 19.5 with respect to the other indirect indicators, notably "accelerating strongly" 19.2. Hence the output of the context-based prediction calculation unit 20 and the prediction information 15 output by the prediction system unit 2 results in prediction of a cut-in behaviour for a mild traffic density as the global scene context, as the output values of indirect indicators 19.1, 19.2, ... 19.N are scaled such that only large gaps are determined and high relative velocities of the vehicles result in a high confidence for a predicted cut-in behaviour.

The embodiment of the context based prediction with global scene context estimation discussed with reference to the FIGS. 7A, 7B, 8 and 9 therefore shows the increased quality of the prediction result when compared to the conventional approach solely relying on a combination of context-based prediction with physical prediction.

In the disclosed embodiment of the GSC estimation unit 11 the estimation of the global scene context is based on one single element contained in the acquired data describing the traffic environment 10. The estimation of the global scene context can also be based on a combination of elements acquired in the data describing the traffic environment 10 in order to increase of confidence of the estimated global scene context, without departing from the invention.

FIGS. 10A, 10B, 11 and 12 describe a further traffic scene handled by an embodiment of the inventive method for predicting a movement behaviour of a target vehicle. The general constellation of vehicle A, vehicle B and host vehicle E corresponds to the situation as discussed before with respect to FIGS. 2A, 2B and does not need to be repeated here.

The sensor units 6.1, 6.2, 6.3 measure vehicle velocities of a plurality of vehicles, preferably all vehicles that are in the range of the sensors and the GSC estimation unit 11 is configured to infer the existence of a global speed limit. The GSC estimation unit preferably uses measured vehicle velocities that have been measured during a predetermined time interval ending at the current point in time when determining the existence of a speed limit and its value. The respective information on existence of a global speed limit can also be generated by evaluation of map information in combination with positional information.

Figure 10A:
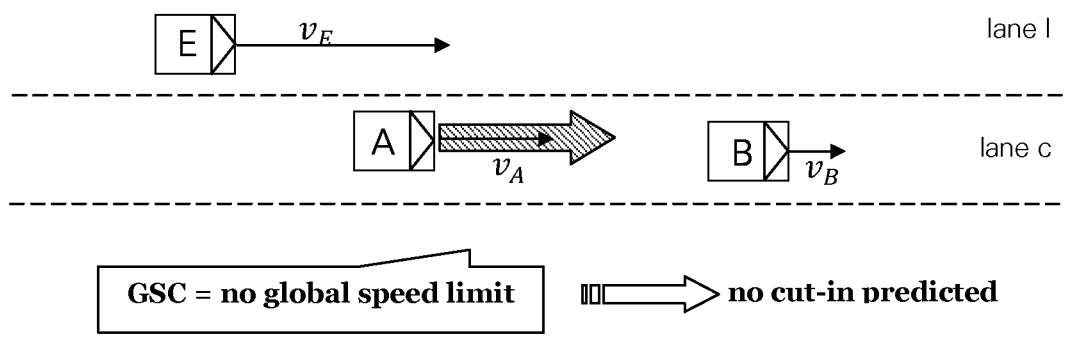
FIG. 10A depicts a traffic scenario with predicted future movement behaviour of the target vehicle according to an embodiment of the invention.

In the situation in FIG. 10A the GSC estimation unit 11 concludes that no global speed limit exists, because the distribution of measured velocities of the plurality of vehicles does not allow fitting an upper limit.

Figure 10B:
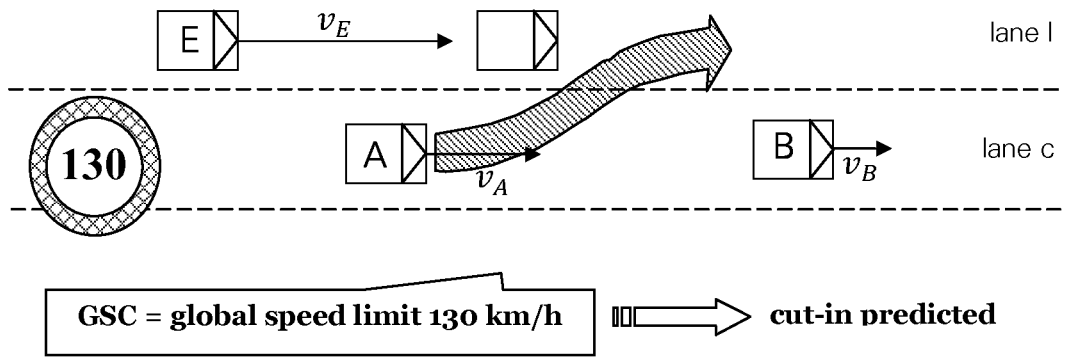
FIG. 10B depicts a traffic scenario with predicted future movement behaviour of the target vehicle according to an embodiment of the invention.

In the situation depicted in FIG. 10B the GSC estimation unit 11 determines a global speed limit of 130 km/h to be in existence, because the distribution of velocities reveals that only some of the vehicles drive faster and thus an upper limit for the speed can be fitted.

Figure 11:
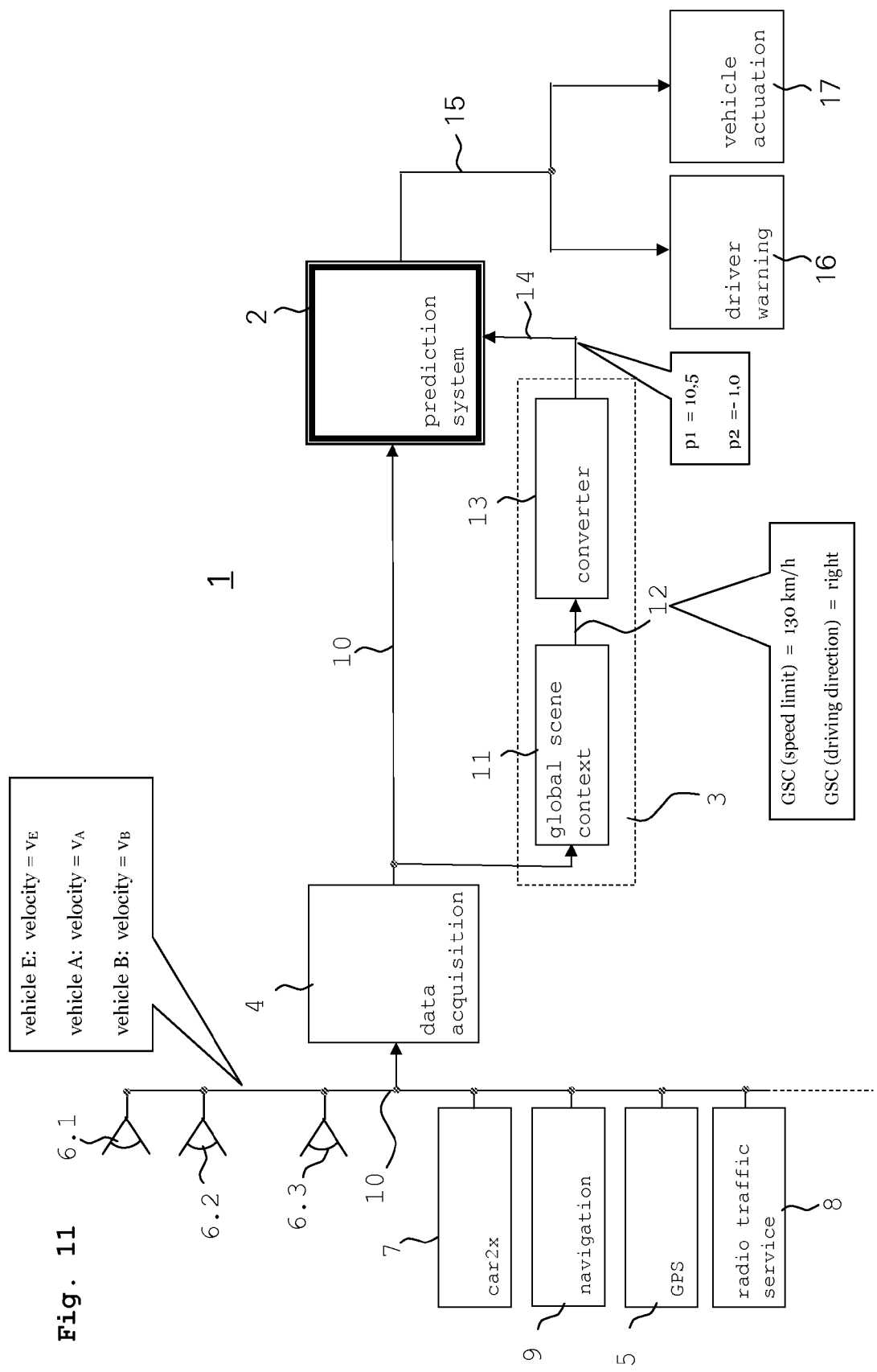
FIG. 11 depicts a schematic for generating a prediction signal in a prediction system according to an embodiment of the invention.

In FIG. 11 an embodiment of the inventive method for predicting movement behaviour of a target vehicle with global context estimation discussing the relevant information flow is shown. The data describing the traffic environment 10 of the target vehicle is shown to include measured or otherwise acquired speeds $v_A$, $v_B$, $v_E$ for target vehicle A, vehicle B and host vehicle E. The GSC estimation unit 11 logs the behaviour of the surrounding vehicles to the target vehicle E continuously by acquiring values with respect to their positions and their velocities. The acquired values describing position and velocity of the vehicles A, B and host vehicle E are integrated to deduce traffic states from the acquired values in the data describing the traffic environment.

For example a position or a direction of an overtaking lane allows determining a traffic direction. The maximum perceived speed can in one example be used to provide a suggestion for existence of a speed limit and a presumed value for the maximum allowed speed. The GSC estimation unit 11 generates GSC information 12 and provides the GSC information 12 to the GSC converter unit 13. The GSC converter unit 13 processes the GSC information 12 including reference to a general speed limit of 130 km/h and converts the traffic state "global speed limit of 130 km/h" into a set of parameters configured to change the prediction computation in the prediction system unit 2 in order to take account of the determined global speed limit of 130 km/h.

In case of the determined global speed limit of 130 km/h of FIG. 10B, an indicator value of the indirect indicator "fitting left gap" 19.5 in the indirect indicator calculation unit 19 may be changed such that it leads to a cut-in behaviour prediction if the target vehicle is driving above the estimated global speed limit weakening the effect of the relative distance and/or velocity to the gap's rear boarder. The GSC converter unit 13 generates the corresponding prediction adaptation information 14, for example a weighting value and provides the generated prediction adaptation information to the prediction system unit 2.

Figure 12:
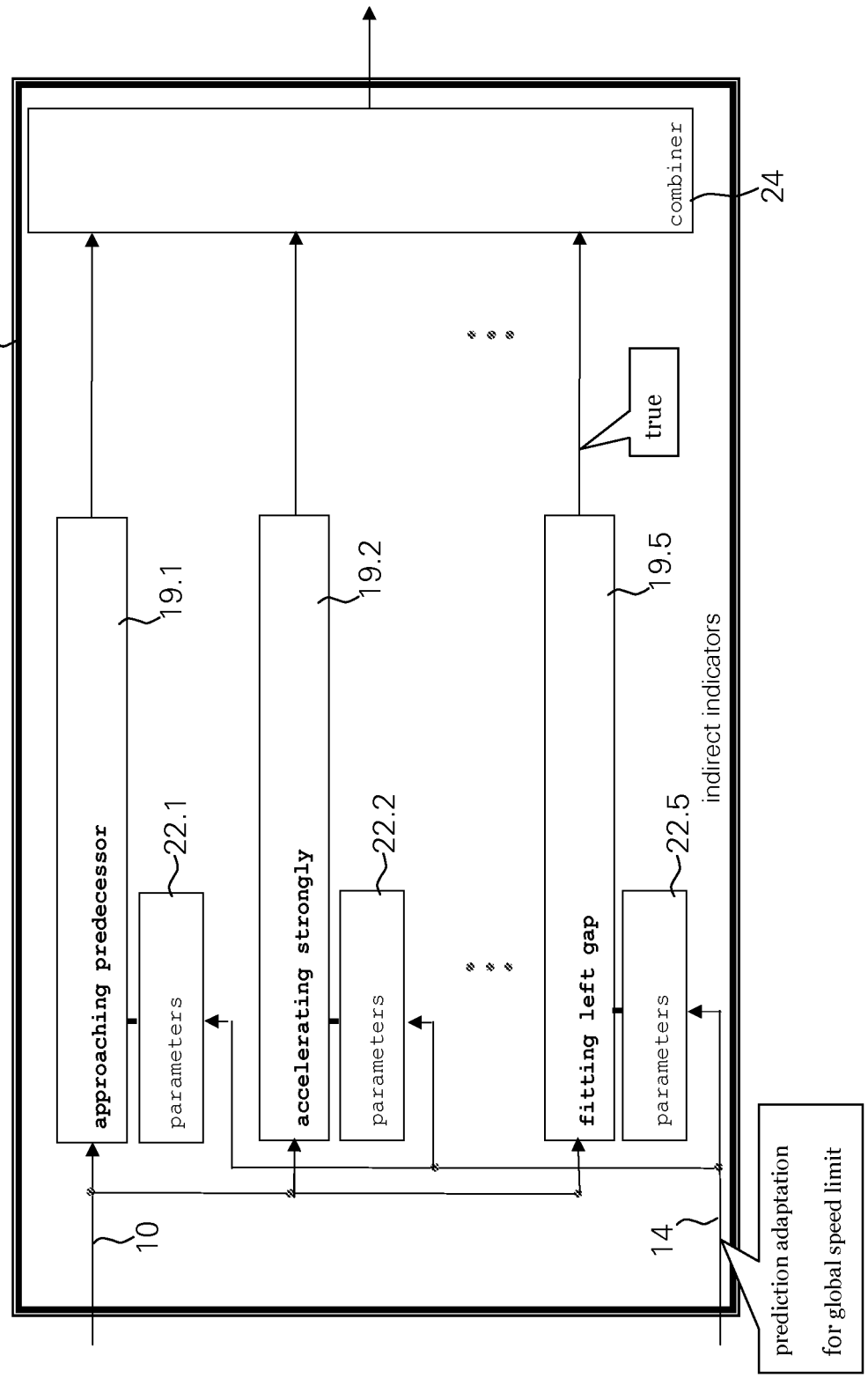
FIG. 12 depicts a schematic for generating indirect indicators in a prediction system according to an embodiment of the invention.

FIG. 12 depicts the respective computation of the indirect indicators 19.1, 19.2, 19.N using parameters 22.1, 22.2, ..., 22.5 in the indirect indicator calculation unit 19 of the prediction system unit 2 for a global speed limit. The prediction adaptation information 14 input to the prediction system unit 2 includes information for the calculation of the indirect indicator "fitting left gap" 19.5 in a manner such that high indicator values are calculated if the target vehicle A is driving above the global speed limit. These high values are even calculated in case a time-to-contact (TTC) to a gap's rear border is low. In an example of the discussed embodiment a gap is usually considered to fit well if the TTC value is above 6 seconds. In case of a global speed limit the parameters 22.5 used in the calculation of the indirect indicator "fitting left gap" 19.5 may be changed to reduce the TTC value to a value of 4 seconds if the target vehicle is driving above the global speed limit.

When alternatively estimating that no global speed limit exists as depicted in FIG. 10A, the GSC converter unit 13 is configured to generate a prediction adaptation information 14 that reduces the indicator value of the indirect indicator "fitting left gap" 19.5 in a manner suitable to avoid a cut-in behaviour prediction or the system is resetted to its normal operation.

Figure 13A:
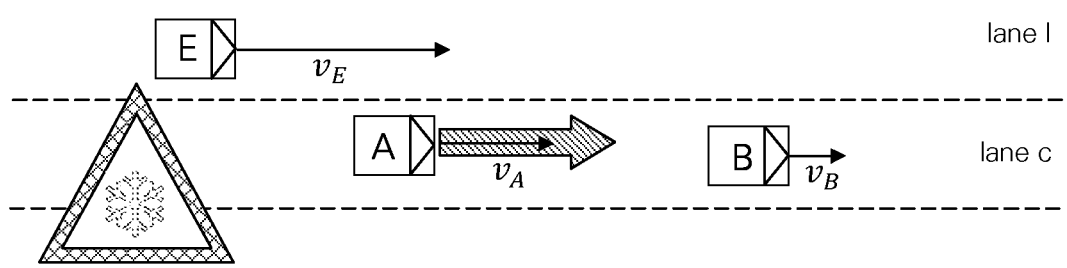
FIG. 13A depicts a traffic scenario with predicted future movement behaviour of the target vehicle according to an embodiment of the invention.
Figure 13B:
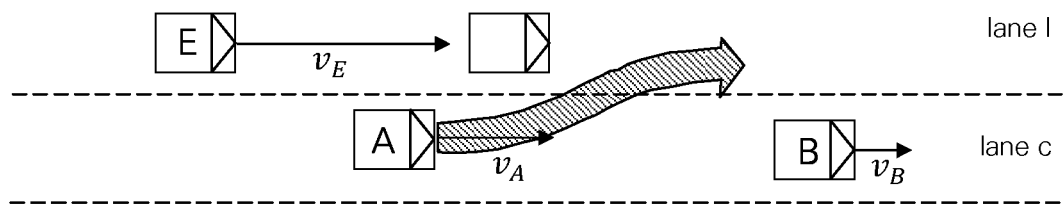
FIG. 13B depicts a traffic scenario with predicted future movement behaviour of the target vehicle according to an embodiment of the invention.

FIGS. 13A and 13B detail a further traffic constellation for explaining a further embodiment of the invention.

In case of FIG. 13A the data describing the traffic environment 10 acquired by the data acquisition means 4 includes information about the road ahead in driving direction of the target vehicle. The data about the road show an icy road as a specific state of the road. The information of this kind may for example be deduced from detected slipping wheels of a predecessor vehicle and communicated via car-to-infrastructure communication and being distributed to other vehicles driving in the affected area.

In FIG. 13A the information about the road ahead of the target vehicle A includes information on an icy road. The GSC information 12 generated in the GSC estimation unit 11 includes therefore an identifier for the road condition to be "icy". In consequence the GSC converter unit 13 is configured to generate a prediction adaptation signal which leads to suppressing the probabilities for a lane change behaviour of the target vehicle A.

Figure 14:
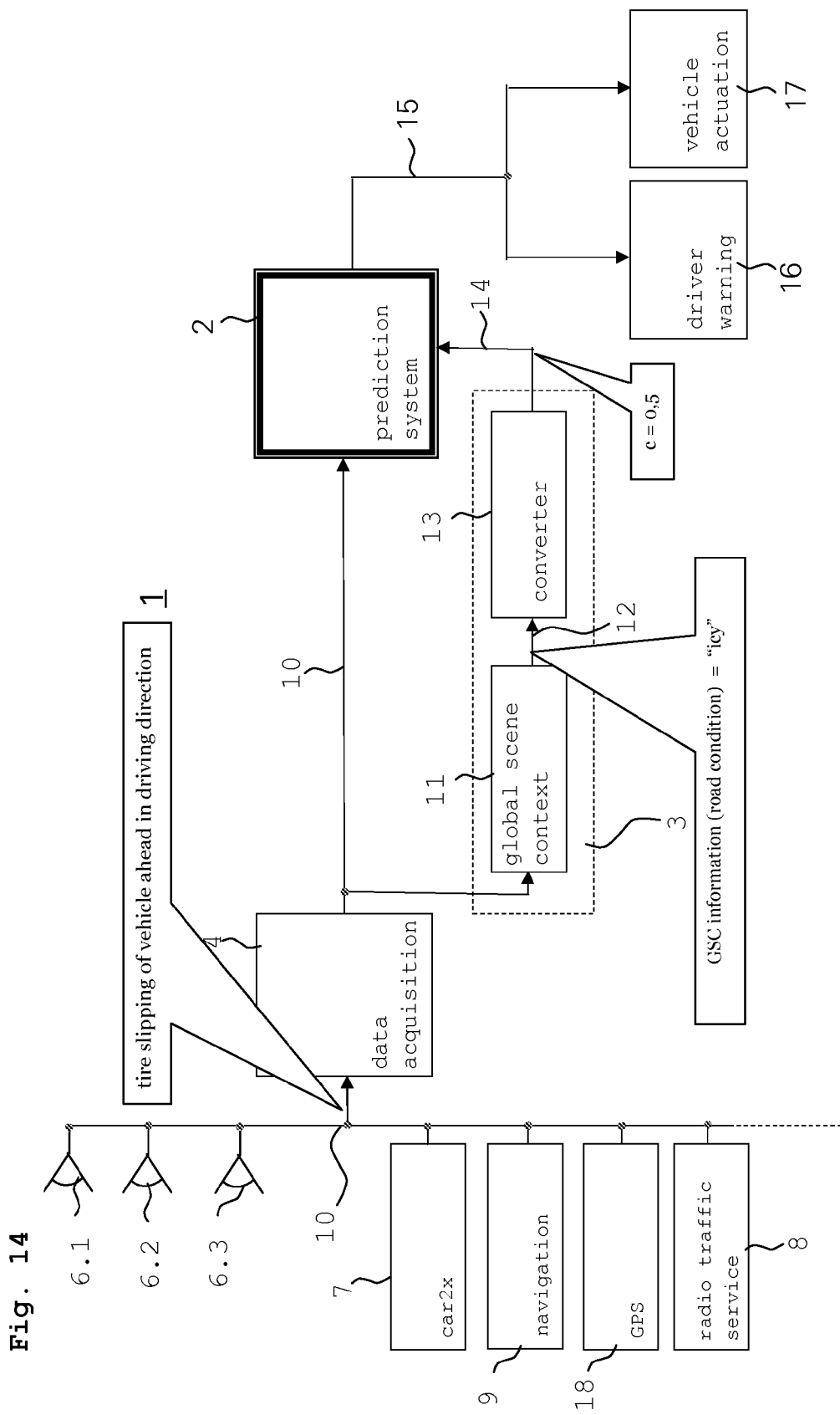
FIG. 14 depicts a schematic for generating a prediction signal in a prediction system according to an embodiment of the invention.

The corresponding information flow in the FIG. 14 accordingly shows data describing the traffic environment acquired by the data acquisition means 4 that tires of a vehicle 1 km ahead slip. The respective road condition in the GSC information 12 defines an icy road condition as global context. The GSC converter unit 13 processes the GSC information 12. The general suppression of any probability of a lane change is achieved in the embodiment of FIG. 14 by converting the term "road condition=icy" in the GSC converter unit 13 to a prediction adaptation information 14 comprising a parameter "C=0.5" to be transferred to the prediction system unit 2.

Figure 15:
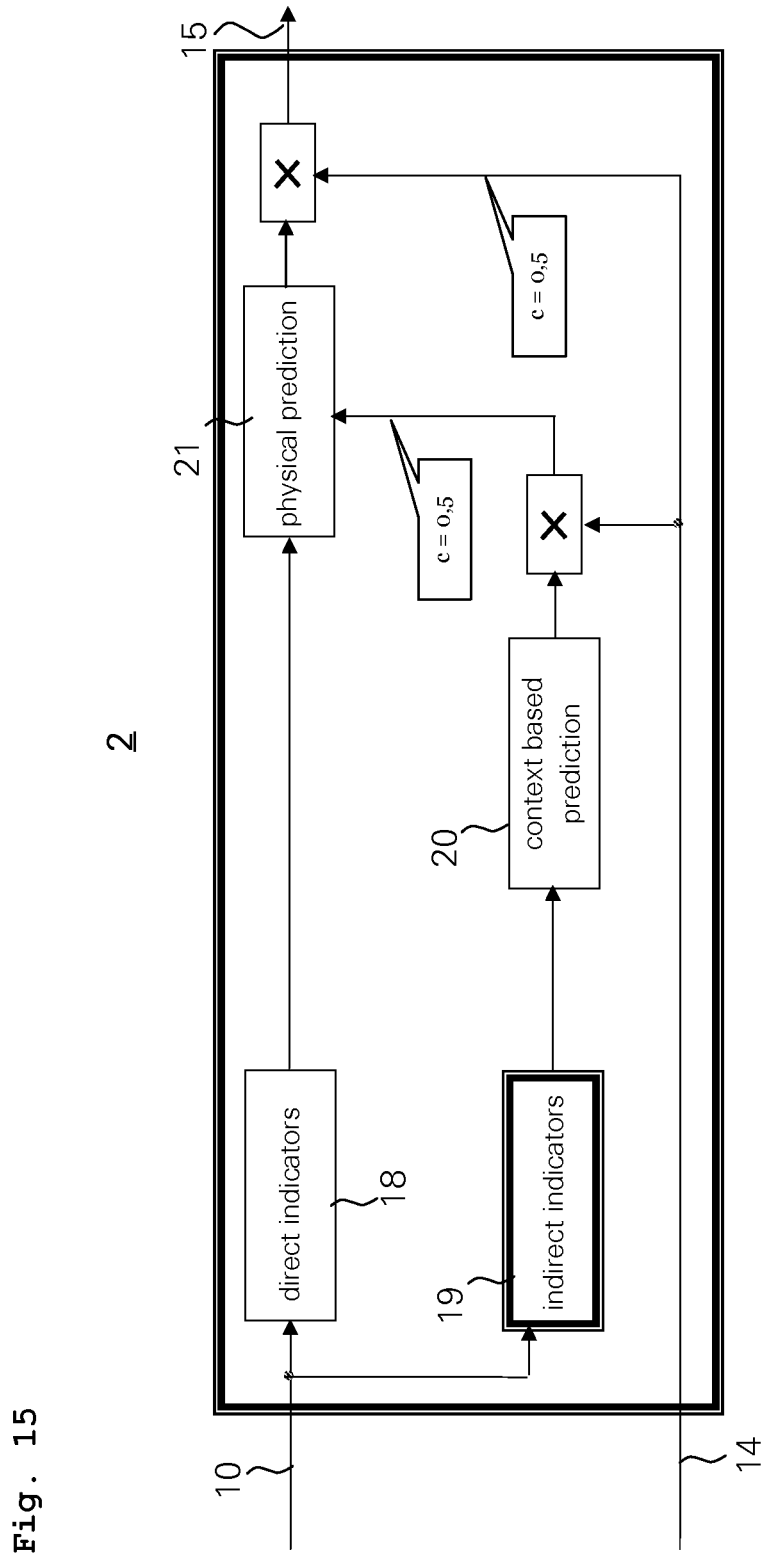
FIG. 15 depicts a schematic for generating indirect indicators in a prediction system according to an embodiment of the invention.

FIG. 15 shows in more detail the processing in the prediction system unit 2 in reaction to the prediction adaptation signal 14 generated in reaction to a GSC information 12 containing an global scene context of an icy road. The probability of lane change behaviour is decreased by directly reducing the calculated probabilities of the lane change behaviour in context-based and/or physical prediction. Such reduction of probability can be implemented by multiplying the probabilities output by the physical prediction calculation unit 21 and context-based prediction calculation unit 20 with a predefined constant value.

The prediction adaptation information 14 can comprise at least one of scaling values for the indirect indicators 19.1, 19.2, . . . , 19.N, for the parameters 22.1, 22.2, . . . , 22.N used in calculation of the indirect indicators 19.1, 19.2, . . . , 19.N in the indirect indicator calculation unit 19 and the prediction information 15 output by the prediction system unit 2. In particular the embodiment depicted in FIG. 15 shows in an exemplary manner, that a combination of scaling parameters for the output of the prediction computation and the adaptation of prediction probabilities is also possible without departing from the inventive method. And of course, the different possibilities of prediction adaptation information and their use are not limited to the traffic scenes that are used as examples to explain the invention.

Figure 16:
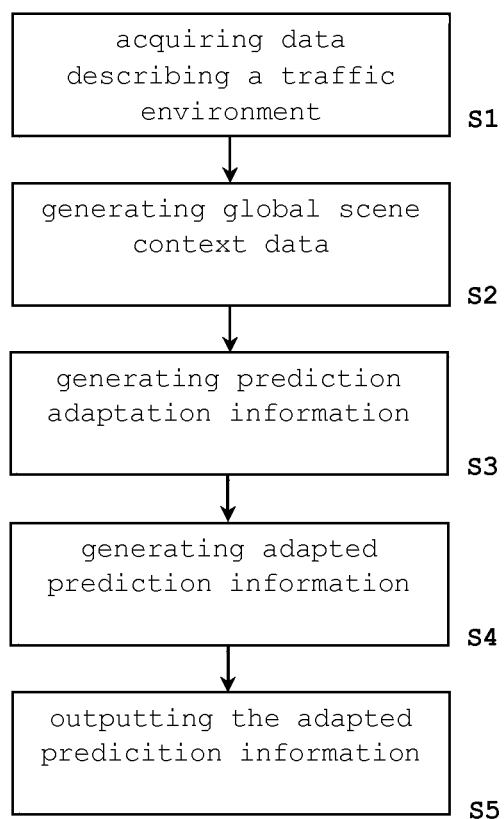
FIG. 16 is a flowchart for assisting a driver by employing a prediction system according to an embodiment of the invention.

FIG. 16 depicts a flowchart depicting the sequence of method steps executed in an embodiment of the invention. The method for assisting a driver of the host vehicle comprises a first step S1 of a data acquisition means 4 acquiring data describing a traffic environment 10 of a host vehicle. In a succeeding step S2, global scene context information 12 is generated based on the acquired data describing the traffic environment 10. Afterwards in the step S3 the GSC information 12 is processed and prediction adaptation information 14 is generated based on the GSC information 12. The succeeding step S4 includes generating an adapted prediction information 15, wherein the prediction information is adapted based on the prediction adaptation information 14 provided by the GSC converter unit 13. In the next step S5 the adapted prediction information 15 is output, for example to an actuating means 17 or a warning means 16.

In summary, according to the present inventive method, system, vehicle and program a calculation of the probability for the target vehicle to perform one of a set of possible future movement behaviours is performed. The movement behaviour prediction is computed by a prediction system, preferably, but not limited to a context-based prediction system and computed taking into account the global context of the traffic environment. All single features of the discussed embodiments may also be combined in an appropriate and advantageous manner.

The invention claimed is:

1. A method for assisting a driver of a vehicle, the method comprising:
   acquiring data describing a traffic environment;
   generating global scene context data from the acquired data describing the traffic environment;
   processing the global scene context data to generate prediction adaptation information;
   generating prediction information based on the acquired data; and
   outputting the prediction information,
   wherein the processing of the global scene context data to generate the prediction adaptation information comprises at least one of:
   generating, as the prediction adaptation information, at least one of a scaling value for modifying at least one indicator value of an indicator in a situation model of a context-based prediction system or a scaling value for parameters used in calculating the indicators,
   generating the prediction adaptation information configured to directly adapt a result of the context-based prediction system, and
   generating the prediction adaptation information configured to directly adapt a result of a physical prediction system,
   wherein the generated prediction information is adapted based on the generated prediction adaptation information, and
   wherein the outputted prediction information is configured to control an actuator of the vehicle.

2. The method according to claim 1, wherein the generating of the global scene context data performing at least one of:
   estimating the global scene context from sensor data acquired by at least one local sensor mounted on the vehicle,
   estimating the global scene context from externally received data, and
   estimating the global scene context from data received via a traffic broadcast service.

3. The method according to claim 2, wherein in the estimating of the global scene context from the sensor data comprises generating the global scene context data by the at least one sensor logging a behaviour or state of other vehicles, and determining a traffic state from the logged behaviour is performed.

4. The method according to claim 1, wherein the processing of the global scene context data comprises performing at least one of:
generating the prediction adaptation information configured to change a prediction calculation in a situation model of a context-based prediction, and
generating the prediction adaptation information configured to modify a probability in a result from at least one of a context-based and a physical prediction.

5. The method according to claim 1, wherein the generating the prediction information comprises the context-based prediction step using indirect indicators, and the physical prediction step using direct indicators for validating a result of the context-based prediction.

6. A system for assisting a driver of a vehicle, the system comprising:
at least one processor for acquiring data describing a traffic environment; and
at least another processor for generating prediction information based on the acquired data describing a traffic environment and to output the generated prediction information,
wherein the at least another processor is configured to generate global scene context data from the data describing the traffic environment and to process the global scene context data to generate prediction adaptation information;
a converter configured to convert the global scene context information to the prediction adaptation information by at least one of:
generating, as the prediction adaptation information, at least one of a scaling value for modifying at least one indicator value of an indicator in a situation model of a context-based prediction system or a scaling value for parameters used in calculating the indicators,
generating the prediction adaptation information configured to directly adapt a result of the context-based prediction system, and
generating the prediction adaptation information configured to directly adapt a result of a physical prediction system,
wherein the at least another processor is configured to adapt the prediction information based on the generated prediction adaptation information, and
wherein the outputted prediction information is configured to control an actuator of the vehicle.

7. The system for assisting a driver of a vehicle according to claim 6, further comprising a global scene context estimation unit configured to generate the global scene context data by performing at least one of:
estimating the global scene context from sensor data acquired by at least one local sensor mounted on the vehicle,
estimating the global scene context from externally received data, and
estimating the global scene context from data received via a traffic broadcast service.

8. The system for assisting a driver of a vehicle according to claim 7, wherein the global scene context estimation unit is generates the global scene context data by the at least one sensor logging a behaviour or state of other vehicles, and determining a traffic state from the logged behaviour.

9. The system for assisting a driver of a vehicle according to claim 6, wherein the converter configured to convert the global scene context information to the prediction adaptation information by at least one of:
generating the prediction adaptation information configured to change a prediction calculation in a situation model of the context-based prediction, and
generating the prediction adaptation information configured to modify a probability in a result from at least one of the context-based prediction or the physical prediction.

10. The system for assisting a driver of a vehicle according to claim 6, further comprising a prediction system configured to generate the prediction information, wherein the prediction system comprises:
a context-based prediction unit configured to generate the context-based prediction information based on indirect indicators, and
a physical prediction unit configured to generate the prediction information based on direct indicators, and to validate the context-based prediction information.

11. A vehicle including a driver assistance system comprising:
at least one processor configured to acquire data describing a traffic environment;
another processor configured to generate prediction information based on the acquired data describing a traffic environment and to output the generated prediction information,
wherein the another processor is configured to generate global scene context data from the data describing the traffic environment and to process the global scene context data to generate a prediction adaptation information; and
a converter configured to convert the global scene context information to the prediction adaptation information by at least one of:
generating, as the prediction adaptation information, at least one of a scaling value for modifying at least one indicator value at indicator in a situation model of a context-based prediction system or a scaling value for parameters used in calculating the indicators,
generating the prediction adaptation information configured to directly adapt a result of the context-based prediction system,
generating the prediction adaptation information configured to directly adapt a result of a physical prediction system,
wherein the another processor is configured to adapt the prediction information based on the generated prediction adaptation information,
wherein the driver assistance system is configured to influence control of the vehicle based on output signals of the driver assistance system, and
wherein the outputted prediction information is configured to control an actuator of the vehicle.

12. A computer program embodied on a non-transitory computer-readable medium, said computer program including program-code that, when the program is executed on a computer or digital signal processor, causes the computer or the digital signal processor to execute the steps of:
acquiring data describing a traffic environment by at least processor configured to acquire data;
generating global scene context data from the acquired data describing the traffic environment;
processing the global scene context data to generate a prediction adaptation information;
generating prediction information based on the acquired data; and outputting the prediction information, wherein the processing of the global scene context data to generate the prediction adaptation information at least one of:

generating, as the prediction adaptation information, at least one of a scaling value for modifying at least one indicator value of an indicator in a situation model of a context-based prediction system or a scaling value for parameters used in calculating the indicators, generating the prediction adaptation information configured to directly adapt a result of the context-based prediction system, generating the prediction adaptation information configured to directly adapt a result of a physical prediction system is performed, wherein the generated prediction information is adapted based on the generated prediction adaptation information, and wherein the outputted prediction information is configured to control an actuator of the vehicle.

* * * * *